Jan. 12, 1960 L. A. SUBLUSKEY 2,920,400
MOLECULAR MODEL CONSTRUCTION
Filed May 11, 1956 2 Sheets-Sheet 1

LEE A. SUBLUSKEY
INVENTOR.

Jan. 12, 1960     L. A. SUBLUSKEY     2,920,400
MOLECULAR MODEL CONSTRUCTION

Filed May 11, 1956     2 Sheets-Sheet 2

LEE A. SUBLUSKEY
*INVENTOR.*

United States Patent Office 2,920,400
Patented Jan. 12, 1960

2,920,400

MOLECULAR MODEL CONSTRUCTION

Lee A. Subluskey, Wilmington, Del.

Application May 11, 1956, Serial No. 584,363

4 Claims. (Cl. 35—18)

This invention relates to the construction of molecular models, i.e., models of molecules, comprising a plurality of generally spherical members representing atoms that are detachably secured together in assemblages of desired configuration by a plurality of rod-like members representative of valence bonds.

In recent years with our ever increasing knowledge on the major role that stereochemical factors play in determining chemical reactivity and physical properties of molecules, molecular models have become an integral part of the research scientist's tools and an indispensable aid to the lecturing professor. There are two basic types: the ball and rod type which enables studying the skeletal relationships of atom positions and valence bond angles, and another type which is designed to observe the exterior contours of the molecule. Both types are widely used and are available commercially. The former employs atoms composed of wooden balls with drilled holes to receive wooden pegs which represent bonds, and the latter uses wooden balls for atoms which have been flattened on the surface areas where snap-fastener bond connectors are located. The bond angles in both these molecular model sets are fixed and no adequate provision is made for the construction of strained ring molecules where the bond angles vary from the normal bond angles of unstrained molecules.

The invention is particularly concerned with the provision of molecular models of the ball and rod type but which have greater manipulative stability and greater flexibility of construction than models of this type heretofore known.

In accordance with the invention there is provided a model construction kit comprising a plurality of essentially rigid rod members each provided with a protuberance at each end thereof and a plurality of resilient, elastic, generally spherical members each having at least one cavity adapted to receive an end of one of said rod members in locking engagement. The model construction kit may also contain a plurality of essentially rigid rod-retaining members which are useful in varying the angles formed between two or more rod members engaged in a spherical member.

The invention will now be described in greater detail with reference to the attached drawings in which.

Figure 1:
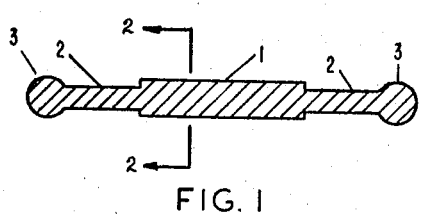
Fig. 1 is an axial sectional view of one embodiment of the rod member representative of a single bond, e.g., the carbon-carbon single bond.
Figure 2:
Fig. 2 is a sectional view taken along line 2—2 of Fig. 1.

Referring more particularly to the drawings, Figs. 1 and 2 illustrate a typical rod member that is generally cylindrical in shape and which may be fabricated of metal, e.g., aluminum, or other material that is essentially rigid. The body portion of the rod member is designated 1 and at each end of the main body there is provided a shank 2 which is of smaller diameter than the body portion of the member, said shank being terminated by a spherical protuberance 3.

Figure 3:
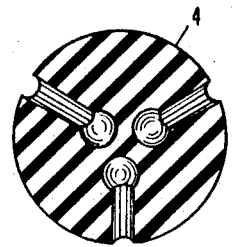
Fig. 3 is a sectional view of one embodiment of a spherical member representative of a tetravalent atom, e.g., the carbon atom.

Fig. 3 illustrates a spherical member 4, representative of a tetravalent atom, that is characterized by being made of rubber or an equivalent material that is resilient and elastic. The spherical member of Fig. 3 has 4 cavities (three of these being shown in the drawing), each cavity being complementary to the size and shape of the shanks 2 and spherical protuberance 3 of the rod members. The cavities in an atom of this type are preferably located so that lines connecting the imaginary center of the cavities at the surface of the spherical member form an equilateral tetrahedron.

Figure 4:
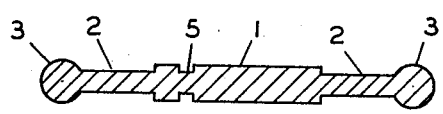
Fig. 4 is an axial sectional view of another embodiment of the rod member representative of a single bond and is particularly useful in constructing molecules with reduced bond angles.

Fig. 4 illustrates a rod member similar to that of Figs. 1 and 2 except for the circumferential indentation 5 which is of approximately the same diameter as the shanks 2. The indentation 5 in rod members of this type are specifically intended for engaging the rod-restraining member illustrated in Fig. 11.

Figure 5:
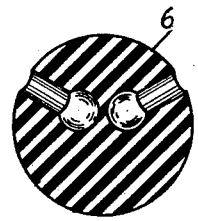
Fig. 5 is a mid-sectional view of an embodiment of a spherical member representative of a divalent atom, e.g., the oxygen atom.

Fig. 5 depicts a spherical member 6 representative of a divalent atom, this spherical member being constructed similarly to the spherical member of Fig. 4 except that the spherical member 5 is slightly smaller and is provided with only two cavities.

Figure 6:
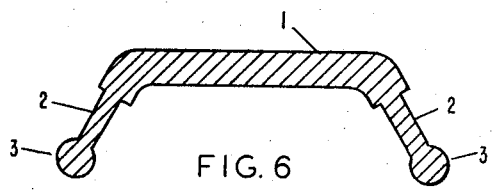
Fig. 6 is an axial sectional view of another embodiment of the rod member that is particularly useful in the construction of doubly and triply bonded molecules.

Fig. 6 illutstrates a rod member similar to that of Figs. 1 and 2 except for obvious difference in shape. Rod members of this type are specifically intended for the construction of double and triple bonds.

Figure 7:
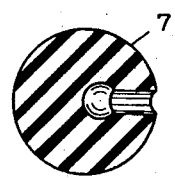
Fig. 7 is a mid-sectional view of an embodiment of the spherical member representative of a monovalent atom, e.g., the hydrogen atom.

Fig. 7 depicts a spherical member 7 representative of a monovalent atom, this spherical member being constructed similarly to the spherical members of Figs. 3 and 5 except that the spherical member 7 is slightly smaller and is provided with only one cavity.

Figure 8:
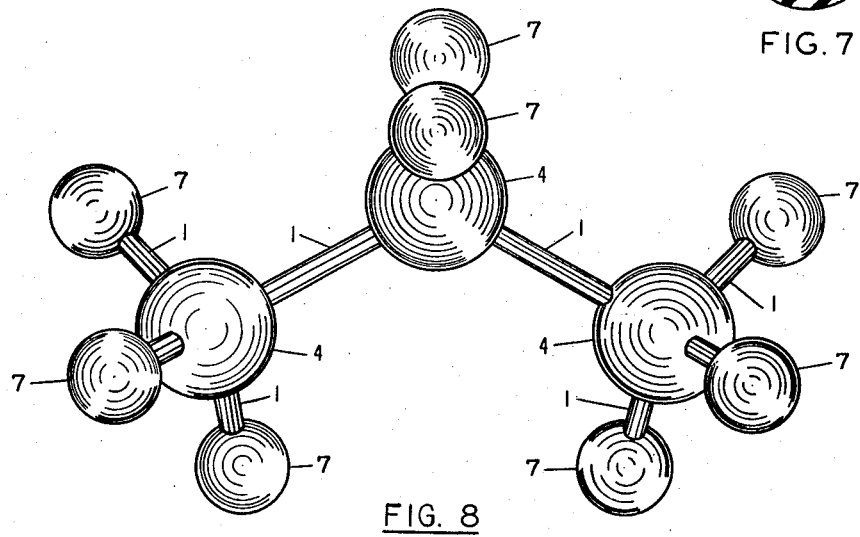
Fig. 8 is a view in perspective of an assembled model of the organic compound, propane.

Fig. 8 illustrates in perspective an assembled model of the organic compound, propane,

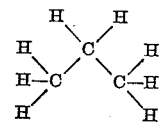

which is formed by assembling together three spherical members of the type shown in Fig. 3 and eight spherical members of the type shown in Fig. 7 by means of ten rod members of the type illustrated in Fig. 1. In making such assembly it is necessary only to insert, with a slight application of force, one end of each rod member into a cavity of one of the spherical members so that the protuberances at the ends of the rod members are firmly held in place by the resiliency of the spherical members.

Figure 9:
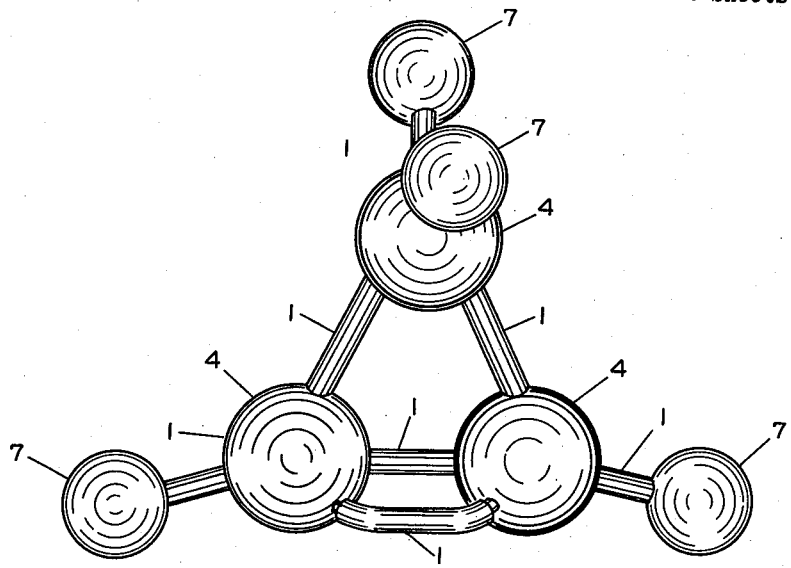
Fig. 9 is a view in perspective of an assembled model of the organic compound, cyclopropene.

Fig. 9 illustrates in perspective an assembled model of the organic compound, cyclopropene,

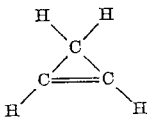

which is formed by assembling together three spherical members of the type shown in Fig. 3 and four spherical members of the type shown in Fig. 7 by means of six rod members of the type illustrated in Fig. 1 and two rod members of the type illustrated in Fig. 6. In making such assembly the same procedure employed in assembling the spherical and rod members to form the model depicted in Fig. 8 is followed.

Figures 10, 11:
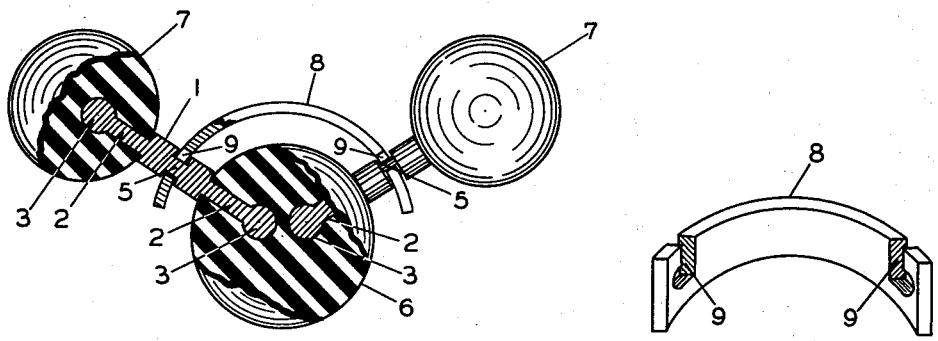
Fig. 10 is a side view with portion broken away and shown in section of an assembled model of the compound, water, with one embodiment of an attached rod-restraining member.
Fig. 11 is a view in perspective of one embodiment of the rod-restraining member.

Fig. 10 is a side view of an assembled model, representing a water molecule, with portions broken away and shown in section to illustrate interconnection details. The axial cross section of the rod member of the type illustrated in Fig. 4 is shown engaged with the spherical members 6 and 7 and with one end of the rod-restraining member 8, this latter engagement being accomplished by insertion of the circumferential indentation 5 of the rod member into one of the locking interstices 9 of the rod-restraining member 8. Complete engagement of the rod-restraining member 8 between both of the rod members shown in Fig. 10 is accomplished by similar insertion of the circumferential indentation 5 of the second rod member into the locking interstice 9 at the other end of the rod-restraining member 8, an operation which requires, with a slight application of force, a reduction of the angle formed between the two rod members and the spherical member 4.

As is obvious from the preceding description, the engagement of a rod member in a spherical member does not depend on friction to prevent accidental withdrawal of the rod member. Consequently, this allows free rotation of a spherical member about the axis of a rod member which is inserted therein thereby permitting accurate representation of the free rotation of atoms existing in actual molecules.

The model molecules assembled as above-described are characterized by exceptional manipulative stability; for instance, they can be dropped repeatedly on a floor or other hard surface without accidental disassembly.

Another advantage of the model construction kit is a variable bond feature which permits the representation of highly strained molecules. To be more explicit, the molecules of some compounds have bond angles which vary considerably from the normal bond angles; for example, the normal bond angle of a carbon atom is 109° 28′, but in some molecules the carbon bond angles may be at a variance from this value by several degrees. Thus, although the cavities in a spherical member of the invention representing a carbon atom may be formed at an angle of 109° 28′ from each other, the angles formed by the rod members inserted into these cavities can be changed by stress (due to the resiliency of the spherical member) permitting models of highly strained molecules to be represented accurately. With cyclopropene, for example, in which

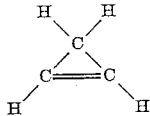

the bond angles between connecting carbon atoms are reduced from the normal bond angles of 109° 28′ to approximately 60°, a representation can be constructed with this model construction kit because the stress exerted by the inherent strain of the 3-membered ring compresses the material of the spherical members representing the carbon atoms between the rod members representing the carbon-carbon single bonds while the terminal spherical protuberances of these rod members remain seated in their respective complementary cavities in the spherical members.

A further advantage of this variable bond angle feature of the model construction kit is the ability to accurately represent bond angles of like atoms that differ in various molecules because of changes in the polar character of the bonding forces between atoms, or because of interacting forces between various atoms. For example, the angle between the valence bonds of oxygen in a water molecule is 105°, while in methyl alcohol this angle is increased to 106°, and in dimethyl ether to 111°. Thus, with a spherical member representing an oxygen atom in which the cavities have been formed at an angle of 111° and the inserted, unstressed rod members correspondingly form an angle of 111°, this angle can accurately be reduced to an angle of 106° or 105° or similar values by exerting a stress on the inserted rod members by the clamping action of the rod-restraining member 8 of proper dimensions.

Still another advantage inherent in the structural features of my model construction kit is accuracy of assembly which is attributable to the fact that insertion of a rod member into a spherical member results in the same depth of entry each time the insertion is made, as predetermined by the size and form of the rod member and cavity.

It is also obvious that many variations can be made without departure from the spirit and scope of the invention. It is apparent, for instance, that a typical model construction kit will include spherical members of varying size and varying number of cavities as representative of several different atoms, e.g., monovalent chlorine atoms, divalent oxygen atoms, etc.

It is also apparent that the spherical members need not be completely constructed from resilient and elastic materials, and for portions of the spherical members not in the vicinity of a contained cavity or cavities, an essentially rigid material can be substituted.

It is also to be understood that the contours of the cavities in the spherical members and the ends of the rod members which are designed to mate the cavities need not be exactly as illustrated in the drawing. It is within the purview of the invention to provide rod members which have a protuberance of any convenient contour at each end and to provide spherical members having cavities into which the ends of the rod members can be inserted and held in locking engagement.

What I claim and desire to protect by Letters Patent is:

1. A molecular model comprising a plurality of essentially rigid rod members each provided with a protuberance at each end thereof, a plurality of resilient, elastic, generally spherical members each having at least one cavity adapted to receive an end of one of said rod members in locking engagement, and at least one essentially rigid rod-restraining member having at least two locking interstices capable of engaging at least two rod members, said rod members and said spherical members and said rod-restraining member having been assembled to represent a molecule by inserting the ends of said rod members into the cavities of said spherical members and inserting the indentations of said rod members into the interstices at the ends of said rod-restraining member.

2. A molecular model construction kit comprising a plurality of essentially rigid rod members each provided with a protuberance at each end thereof, a plurality of generally spherical members each having at least one cavity adapted to receive an end of one of said rod members in locking engagement, and a plurality of rod-restraining members having at least two locking interstices capable of engaging at least two rod members.

3. A molecular model construction kit comprising a plurality of essentially rigid rod members each comprising a cylindrical body terminated at each end by a spherical protuberance of greater diameter than said body, and a plurality of resilient, elastic, generally spherical members each having at least one cylindrical cavity terminated interiorly by a spherical portion of enlarged diameter, said cavity conforming to the size and shape of an end of one of said rod members whereby a rod member can be inserted therein to a predetermined depth and held firmly in place against withdrawal but can be freely rotated about its axis, said rod members and said spherical members being of such dimensions that the spherical members in an assembled model are spaced apart from each other.

4. A molecular model construction kit comprising a plurality of essentially rigid rod members each comprising a cylindrical body terminated at each end by a spherical protuberance of greater diameter than said body, a plurality of resilient, elastic, generally spherical members each having at least one cylindrical cavity terminated interiorly by a spherical portion of enlarged diameter, said cavity conforming to the size and shape of an end of one of said rod members whereby a rod member can be inserted therein to a predetermined depth and held firmly in place against withdrawal but can be freely rotated about its axis, said rod members and said spherical members being of such dimension that the spherical members in an assembled model are spaced apart from each other, and a plurality of rod restraining members each having at least two locking interstices capable of engaging at least two rod members.

References Cited in the file of this patent

UNITED STATES PATENTS

| | | |
|---|---|---|
| 2,052,457 | French | Aug. 25, 1936 |
| 2,308,402 | Taylor | Jan. 12, 1943 |
| 2,714,269 | Charles | Aug. 2, 1955 |

FOREIGN PATENTS

| | | |
|---|---|---|
| 479,746 | Canada | Dec. 25, 1951 |
| 1,101,229 | France | Apr. 20, 1955 |

OTHER REFERENCES

Chicago Apparatus Co. Catalog No. 55, page 682, article and illust. on: Master Crystal Models, copyrighted 1954.